(12) United States Patent
Bates et al.

(10) Patent No.: US 6,961,751 B1
(45) Date of Patent: Nov. 1, 2005

(54) METHOD, APPARATUS, AND ARTICLE OF MANUFACTURE FOR PROVIDING ENHANCED BOOKMARKING FEATURES FOR A HETEROGENEOUS ENVIRONMENT

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 09/583,700

(22) Filed: May 31, 2000

(51) Int. Cl.$^7$ .............................................. G06F 15/16
(52) U.S. Cl. ..................... 709/203; 709/219; 707/3; 707/10; 715/501.1; 715/512
(58) Field of Search ............................... 709/200, 203, 709/217, 227, 245, 249

(56) References Cited

U.S. PATENT DOCUMENTS

| | | | | |
|---|---|---|---|---|
| 6,032,162 A | | 2/2000 | Burke | ........................ 707/501 |
| 6,041,360 A | | 3/2000 | Himmel et al. | ............. 709/245 |
| 6,163,778 A | * | 12/2000 | Fogg et al. | |
| 6,314,423 B1 | * | 11/2001 | Himmel et al. | |
| 6,324,566 B1 | * | 11/2001 | Himmel et al. | |
| 6,493,702 B1 | * | 12/2002 | Adar et al. | ..................... 707/3 |
| 6,526,424 B2 | * | 2/2003 | Kanno et al. | ............... 715/512 |
| 6,560,640 B2 | * | 5/2003 | Smethers | |

* cited by examiner

*Primary Examiner*—Ario Etienne
*Assistant Examiner*—Michael Won
(74) *Attorney, Agent, or Firm*—Moser, Patterson & Sheridan, LLP

(57) ABSTRACT

A method, article of manufacture, and apparatus for identifying bookmark features either on a local browser or generated from a remote browser and sent to the local browser. Specifically, a method for managing bookmark information in a data structure residing on a computer, comprising receiving the bookmark information from a plurality of sources networked to the computer, the bookmark information comprising source identifier information and Uniform Resource Locators (URLs), and storing the bookmark information in the data structure. The apparatus comprises a computer, at least one bookmarking device having a unique source identifier associated therewith and containing a first browser adapted to process uniform resource locators (URLs), and a network connection connecting the computer to the at least one bookmarking device and comprising network addresses identified by the URLs, wherein the at least one bookmarking device transfers the URLs and unique source identifiers to the computer via the network connection.

33 Claims, 4 Drawing Sheets

| | $202_1$ | $202_2$ | $202_3$ | $202_4$ | $202_5$ | $202_6$ | $202_n$ |
|---|---|---|---|---|---|---|---|
| | URL | SOURCE | DATA | TIME STAMP | . . . . | . . . . | . . |
| $204_1$ — | ADDRESS 1 | CELL PHONE | | | . . . . | . . . . | . . |
| $204_2$ — | ADDRESS 2 | LAP TOP | | | . . . . | . . . . | . . |
| $204_3$ — | ADDRESS 3 | LAP TOP | | | . . . . | . . . . | . . |
| $204_4$ — | ADDRESS 4 | PALM ™ | | | . . . . | . . . . | . . |
| $204_5$ — | ADDRESS 5 | CELL PHONE | | | . . . . | . . . . | . . |
| $204_6$ — | ADDRESS 6 | E-MAIL | | | . . . . | . . . . | . . |
| $204_m$ — | ADDRESS m | SOURCE m | DATA m | TIME STAMP m | . . . . | . . . . | . . |

METHOD, APPARATUS, AND ARTICLE OF MANUFACTURE FOR PROVIDING ENHANCED BOOKMARKING FEATURES FOR A HETEROGENEOUS ENVIRONMENT

BACKGROUND OF THE INVENTION

1. Field of the Invention

The invention relates to retrieving web pages in an Internet environment. More particularly, the invention relates to a method, apparatus, and article of manufacture for cataloging bookmark information collected by a browser application.

2. Background of the Related Art

The World Wide Web, i.e., the "Web", is the Internet's multimedia information retrieval system. It is the most commonly used method of transferring data in the Internet environment. Client machines accomplish transactions to Web servers using hypertext Transfer Protocol (HTTP), which is a known application protocol providing users access to files, e.g., text, graphics, images, sound, video, and the like using a standard page description language known as Hypertext Markup Language (HTML). HTML provides basic document formatting and allows a developer to specify "links" to other servers and files. In the Internet paradigm, a network path to a server is identified by a Uniform Resource Locator (URL) having a special syntax for defining a network connection.

Retrieval of information is generally achieved by the use of an HTML-compatible "browser", e.g. Netscape Navigator, installed on a client machine. When a user of the browser specifies a link via a URL, the client issues a request to a naming service to map a hostname in the URL to a particular network IP address at which the server is located. The naming service returns a list of one or more IP addresses that can respond to the request. Using one of the IP addresses, the browser establishes a connection to a server. If the server is available, it returns a document or other object formatted according to HTML.

Since the IP addresses returned to the client may be very lengthy, browsers offer a bookmark system for the creation of a bookmark list. The bookmark serves as a shortcut to go to a specific address previously bookmarked by the user.

Once created, bookmarks offer a technique for rapid page retrieval. The user can cause the browser to display his bookmark list and select among his bookmarks to go directly to a specific web page. Thus, the user is not required to enter a lengthy URL, or retrace the original route through the Internet by which he may have arrived at the Web site. Once the bookmark is added to the bookmark list, in general, the bookmark becomes a permanent part of the browser until removed.

Despite their usefulness, the current arrangement of bookmarks is not without flaws. As the number of web sites and web pages on these sites have increased dramatically, so have the number of bookmarks that a user maintains on his browser. It is not uncommon to have hundreds of bookmarks stored in a bookmark file by a user. Furthermore, the bookmarks may be generated and conveniently shared from various platform sources and locations, such as a desktop browser, a portable laptop, cellular phone, set-top box, personal data assistants, and the like. As a result, problems often arise while the user of the browser attempts to manage the bookmark list. Such problems include unmanageable growth of the bookmark list, loss of time in searching through the bookmarks, distinguishing which bookmarks are important or irrelevant, and the like.

SUMMARY OF THE INVENTION

The present invention provides a method, apparatus, and article of manufacture for identifying bookmark features in an Internet browser installed on at least one remote platform device from a local browser. In one embodiment of the invention, a method for managing bookmark information in a data structure residing on a computer, comprising receiving the bookmark information from a plurality of sources networked to the computer, the bookmark information comprising source identifier information and Uniform Resource Locators (URLs), and storing the bookmark information in the data structure.

In a second embodiment of the invention, a computer-readable medium having instructions or programs which, when executed by a process cause the process to perform a method, comprises receiving the bookmark information from a plurality of sources networked to the computer, the bookmark information comprising source identifier information and Uniform Resource Locators (URLs), and storing the bookmark information in the data structure.

In a third embodiment of the invention, an apparatus comprises a computer, at least one bookmarking device having a unique source identifier associated therewith and containing a first browser adapted to process uniform resource locators (URLs), and a network connection connecting the computer to the at least one bookmarking device and comprising network addresses identified by the URLs, wherein the at least one bookmarking device transfers the URLs and unique source identifiers to the computer via the network connection.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

The present invention relates to a method for managing bookmarks stored in a web browser. Specifically, the invention relates to a method for storing bookmark features created by browsers installed on a user's primary computer system and associated remote platform devices.

Figure 1:
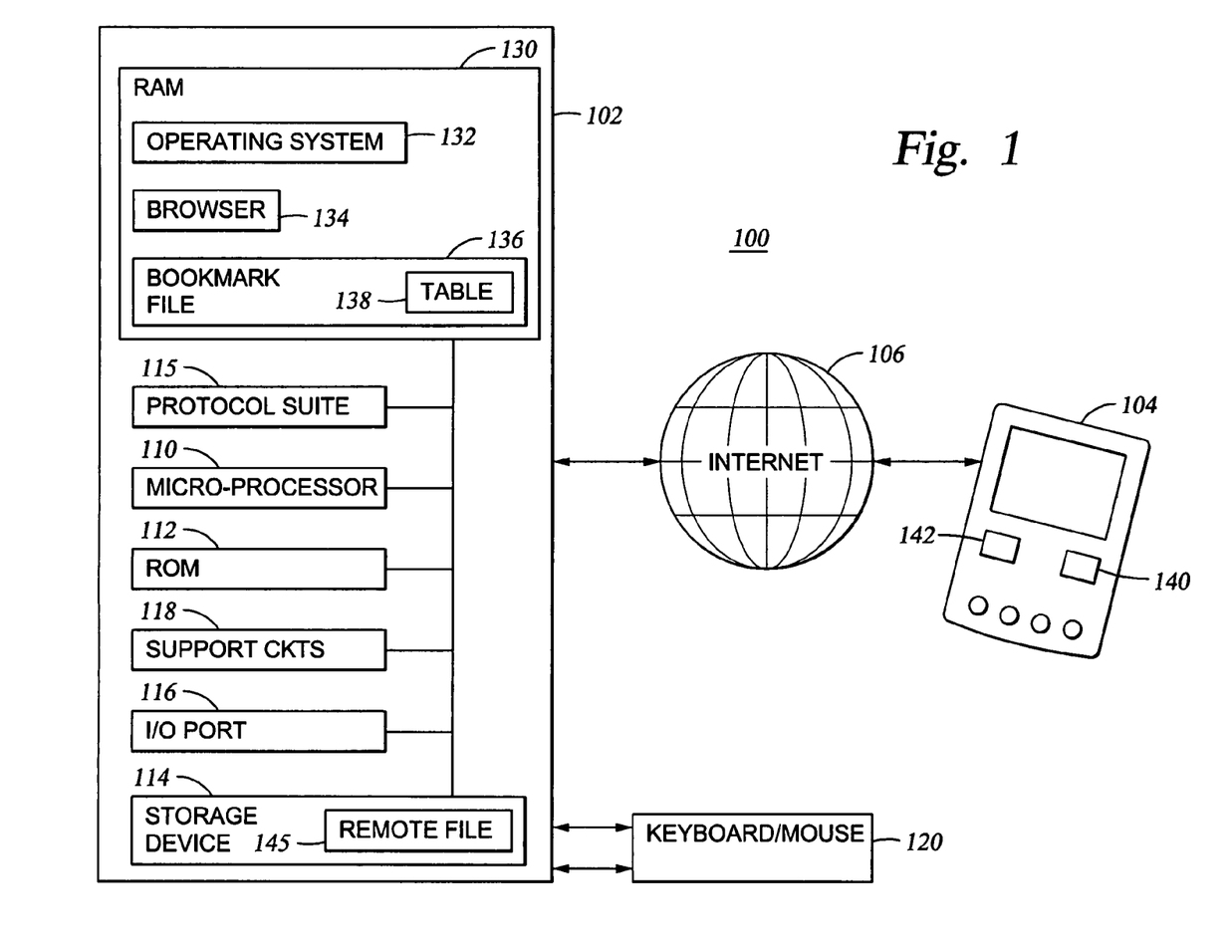
FIG. 1 depicts a block diagram of a remote platform device linked to a primary computer system via the Internet.

FIG. 1 depicts a remote platform device 104 linked to a computer system 102 via a communications network 106, such as the Internet, in a networked system 100. The remote platform device 104 may be local or mobile such as a personal data assistant, cellular phone, laptop computer, pager, or any other device that has Internet browsing and bookmarking capabilities. In a preferred embodiment, the computer system 102 (hereinafter "local platform computer 102") may be a desktop computer, which a user primarily accesses for communicating through the Internet 106, however a person skilled in the art will recognize that a computer network, server, or the like, may alternately be utilized. Furthermore, a person skilled in the art will recognize that in the alternate, a user may primarily access the remote platform device 104.

The local platform computer 102 comprises at least one system bus 108 to which various components are coupled and communicate with each other. Specifically, a microprocessor 110, ROM 112, hard disk 114, memory (RAM) 130, an I/O port 116, protocol suite 115, and other support circuits 118 are coupled to the system bus 108. The microprocessor 110 receives information from each of the computer components coupled to the system bus 108 and performs system operations based upon the requirements of the computer system's software operating system 132 and application programs (e.g., a Web browser 134) that are installed thereon. The microprocessor 110 may be an INTEL PENTIUM® type processor or the like. The ROM 112 typically includes a Basic Input-Output System (BIOS) program, which controls basic hardware operations such as the interaction of the microprocessor 110 with a keyboard/mouse 120, hard drive 114, or video display (not shown), and the other devices. The RAM 130 is volatile memory that loads the operating system 132 and applications software 134 as required, from a permanent storage medium 114 such as a hard drive or a CD-ROM player (not shown) where such software programs are permanently stored. The permanent storage medium 114 (e.g., hard drive) is also utilized to store files, e.g., "remote device files 145" transmitted from the remote platform devices 104. The I/O port 116 includes various controllers (not shown) for input devices such as the keyboard and mouse 120, and output devices such as an Ethernet network adapter or infrared device (not shown). The protocol suite 115 is a collection of software modules that collectively permit communications between dissimilar devices, such as the local computer 102 and the remote device 104. Typically, other support circuits 118 include controllers for the hard drive 114, floppy drive, graphics display, and the like (not shown).

The operating system 132 may be IBM's OS/2 WARP 4.0® system. The operating system is capable of interfacing with all of the hardware components of the computer 102. An applications program is a user specific program such as a word processing program (not shown) or a web browser 134. In general, a web browser 134 is a program that allows viewing the content of the Internet. In particular, a web browser 134 is a program, which is capable of parsing and presenting a document written in hypertext markup language (HTML) or other programming languages. The browser 134 that is installed on the user's local platform computer system 102 is the local browser utilized by a user, and is linked through the Internet 106 via a communications medium such as telephone wire, cable, wireless device, and the like. However, one skilled in the art will recognize that any device may be labeled a local system and browser, depending on the user's requirements. Likewise, the remote platform devices 104 have a remote browser 140 and memory 142 installed thereon, and are also linked to the Internet in a similar manner. For example, a remote platform device 104 such as a laptop may have a modem (not shown) that communicates through telephone lines. Furthermore, one skilled in the art will also recognize that the remote platform device 104 includes processing circuitry, storage media, I/O devices and support circuits (not shown) necessary to process and store information in a similar manner as the local platform computer system 102. Additionally, one skilled in the art will also recognize that bi-directional communications between a local platform and remote platform device is also contemplated in the present invention.

Communications between the local platform computer system 102 and remote platform devices 104 may occur in any standard format that allows the transfer of files or data packets from one device to another. Such communication channels may include modem connections, wired local area networks (e.g., ETHERNET or Token Ring), wireless communications, and the like. Each communications medium has its own communication protocols for transferring and receiving information from another source. For example, the transfer protocols may include XMODEM, YMODEM, OR ZMODEM protocols for modems, File Transfer Protocol (FTP), HTTP for networked systems, and the like. Furthermore, the inventive embodiments contemplate security features that allow file transfers upon initiating a password, using encryption techniques, and the like.

Browsing the Web is facilitated by various methods known in the art. For example, a user may enter a network address (e.g., a URL) into an address box of the browser and then submit the URL to the browser's search algorithms (e.g., by pressing the "enter" key on a keyboard). Alternatively, the user may traverse to another Web page by clicking selectable areas within the browser window known as hyperlinks (typically in the form of text, images, or graphics in a page), thereby calling another page of related information to the display screen. Each hyperlink contains URL location information that serves as an address of the web site. Additional navigational aids such as "Back" and "Forward" buttons typically located in a browser toolbar permit a user to proceed either back or forward to pages that have been previously accessed. The other navigational aids that connect a user with web page addresses are the bookmarks.

As described in detail herein, aspects of the preferred embodiment pertain to specific method steps implementable on computer systems. In an alternative embodiment, the invention may be implemented as a computer program-product for use with a computer system. The programs of the program-product define the functions of the preferred embodiment and may be delivered to a computer via a variety of signal-bearing media, which include, but are not limited to, (a) information permanently stored on non-writable storage media (e.g., read-only memory devices within a computer such as CD-ROM disks readable by CD-ROM drive); (b) alterable information stored on writable storage media (e.g., floppy disks within diskette drive or hard-disk drive 114); or (c) information conveyed to a computer by a communications medium, such as through a computer or telephone network, including wireless communications. Such signal-bearing media, when carrying computer-readable instructions that direct the functions of the present invention, represent alternative embodiments of the present invention.

Figure 2:
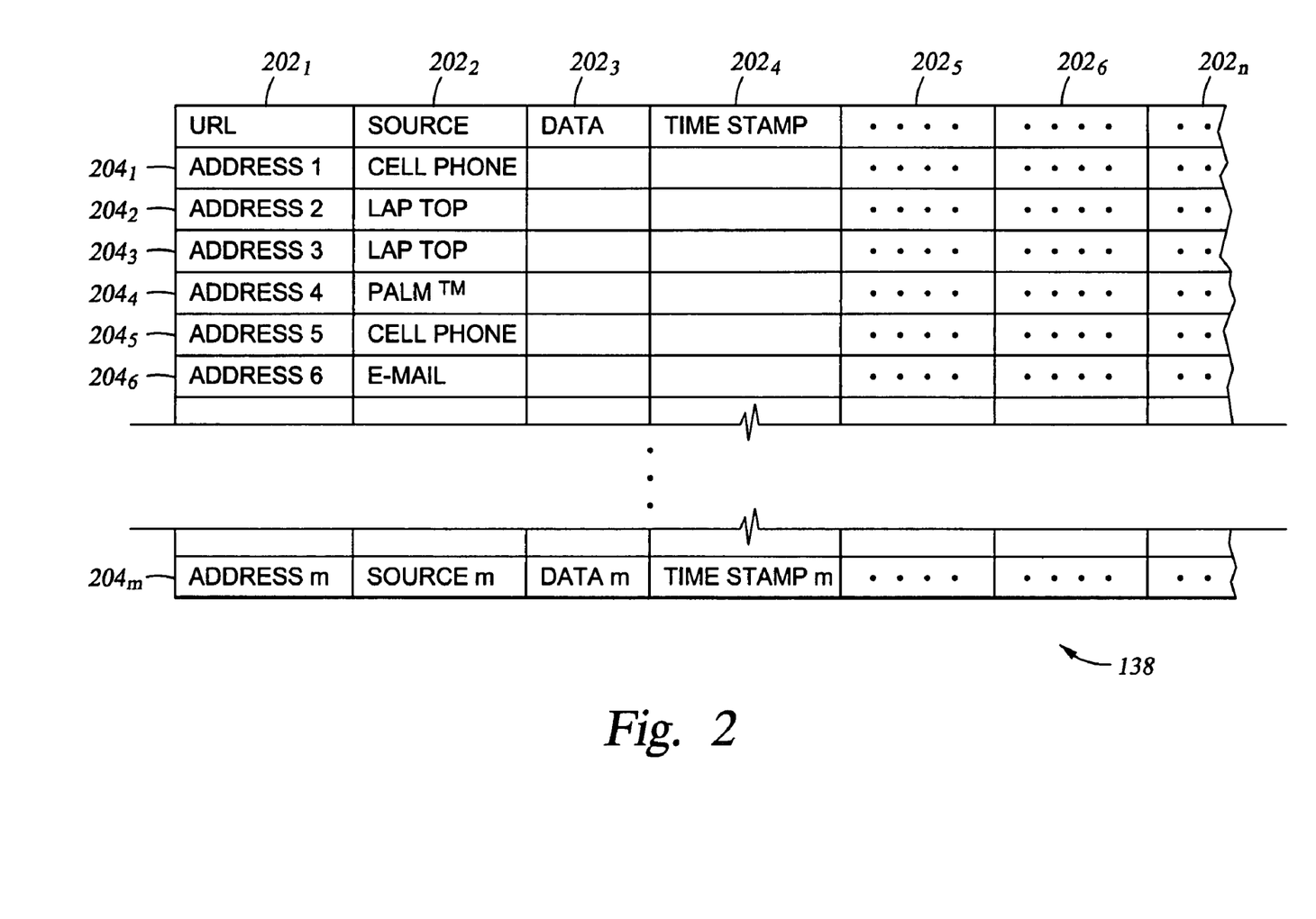
FIG. 2 depicts a bookmark table of the present invention.

FIG. 2 depicts a bookmark identification table 138 of the present invention. The bookmark identification table 138 is a bookmark file 136 that is stored as part of the browser 134 on the user's local platform computer system 102. Permanent storage of the browser 134 (hereinafter, "local browser 134") exists in files stored on a medium such as a hard drive 114. Upon activating a bookmark application, the bookmark file 136 is transferred to the RAM 130 to facilitate greater processing speed by the microprocessor 110 of the computer 102. A person skilled in the art will recognize that memory management techniques such as memory paging may be utilized to store portions of the browser 134 and bookmark file 136 in the RAM 130, where lesser utilized portions of such browser or bookmark files remain in the permanent storage mediums 114 until required by the processor 110.

Each bookmark comprises a plurality of fields $202_1$ through $202_n$ (collectively bookmark fields 202) to collectively define a bookmark entry. Each bookmark entry is stored sequentially in rows $204_1$ through $204_m$ (collectively rows 204) of the bookmark table 138. Thus, the bookmark file 136 comprises the bookmark table 138 and is capable of storing "m" bookmarks, where m may be any number of bookmark entries as created by the user. The fields 202 of the present invention comprise a URL field $202_1$, a source field $202_2$, a source specific data field $202_3$, and a time stamp $202_4$. The remaining fields $202_{5-n}$ represent fields of related data that are also stored in a bookmark file 136 such as last time used, number of site visits, and the like.

Rows $204_{2-m}$ are additional bookmark addresses selectively set and stored by the user during the course of browsing the Internet. Whenever a bookmark is generated, regardless of source, the four fields $202_{1-4}$ contain information that is stored as part of an entry in the bookmark table 138. In this regard, most of the bookmarks are generated using a user's local browser source. As discussed previously, the present invention also permits a user to share bookmarks amongst a plurality of remote platform devices 104 that have web-browsing capabilities. Such devices may include a laptop, set-top box, e-mail, cellular phone, and the like.

Source field $202_2$ provides a field for storing the type of remote platform device 104 that is setting the bookmark. For example, if the fifth bookmark is made from a cellular phone, then the fifth row $204_5$ will have the URL address stored in the first field $202_1$ of the fifth entry $204_5$. Furthermore, the name of the remote platform device "cell phone" is set in the second field $202_2$ of the fifth entry $204_5$. Alternatively, if the bookmark were generated from the user's local platform computer system 102, the source field $202_2$ would illustratively be set to "desktop computer".

The source specific data field $202_3$ represents pertinent bookmark information unique to the individual remote source 104. Such pertinent information provides supplemental or additional information with respect to the source field $202_2$ and may illustratively include a name of a person who placed the bookmark if the remote platform device is e-mail, or a specific channel or program if the remote platform device is a set-top box. Alternate information may include a location, if the remote platform device is a cellular phone having Global Positioning System (GPS) capabilities, and the like. A person skilled in the art will recognize that virtually any additional identifying information may be placed and stored in the source specific data field $202_3$.

Furthermore, a timestamp is generated and inserted into a timestamp field $202_4$ to provide temporal information regarding a date and time when the bookmark was created. Typically, the browser 134 allows a user to set the format of the temporal information for viewing as desired.

Figure 3:
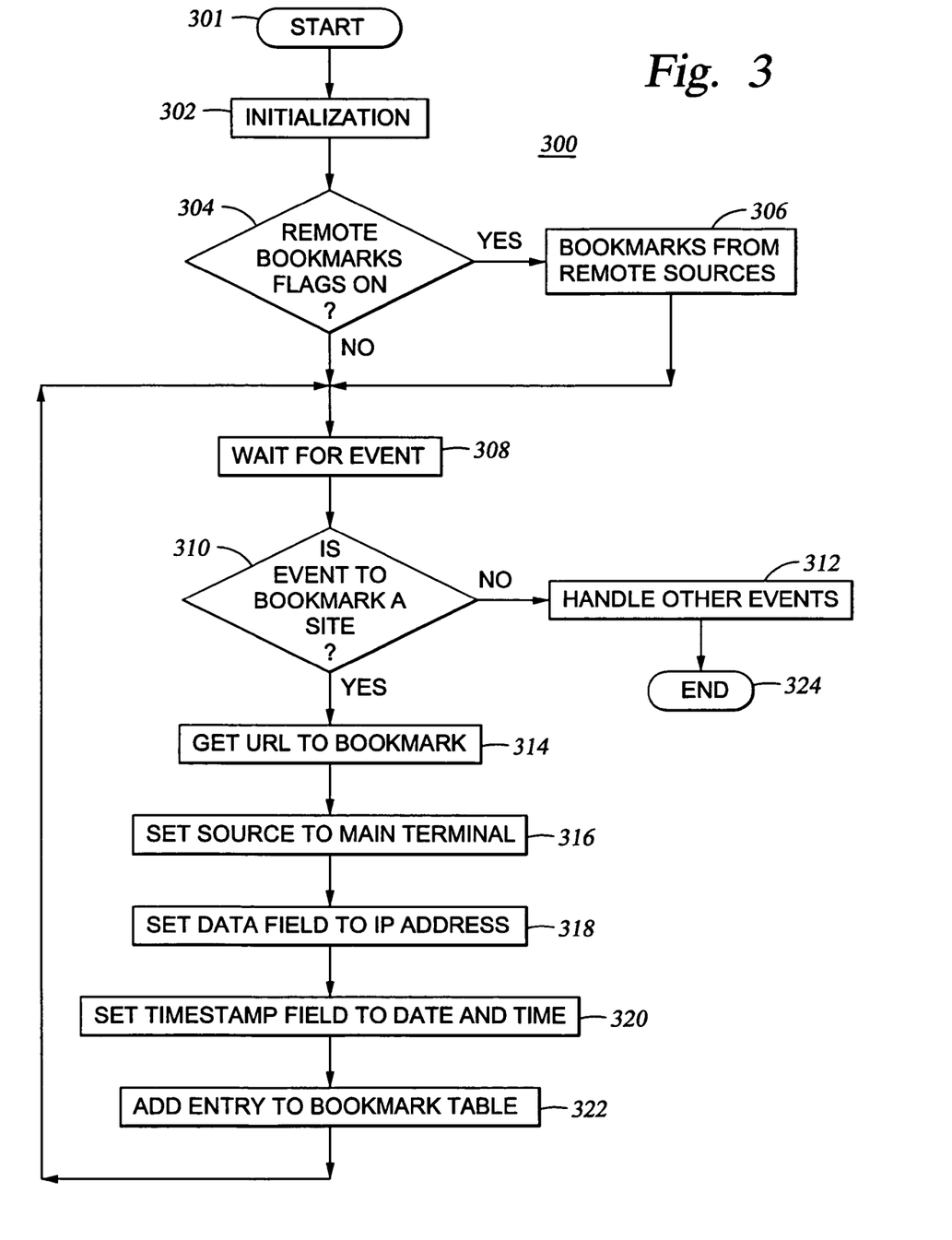
FIG. 3 depicts a flowchart of a method of managing bookmark information at a primary browser in accordance with the present invention.

FIG. 3 depicts a flowchart of a method 300 of managing bookmark information on a user's local browser (e.g., browser 134) in accordance with the present invention. Generally, the method 300 collects the bookmark information, and parses the information into categories for population into a plurality of fields $202_{1-n}$ of a bookmark table 138, and combines the fields $202_{1-n}$ together to form a bookmark entry. The method 300 then stores the bookmark entry in tabular form 138 in a bookmark file 136 in the local platform computer 102.

In particular, method 300 begins at step 301 and proceeds to step 302 where a browser located at a non-remote (i.e., local platform 102) site such as a desktop computer is initialized. In step 302, during initialization, the local browser application 134 is started and the method proceeds to step 304. In step 304, the local browser 134 queries whether there are any bookmarks received from an external, i.e., remote platform device 104 such as a laptop, e-mail, set-top box, personal data assistant (PDA), or the like. In one embodiment, upon receiving a bookmark entry from a remote platform device 104, a bookmark flag typically located in a register is set to an "ON" position from a default "OFF" position. The bookmark flag simply checks the existence of a file from a remote source. One skilled in the art will recognize that other methods may be utilized to notify the local browser of receiving a bookmark from a remote browser 104 in a remote source. If, in step 304, the query is affirmatively answered, i.e., the bookmark flag is set in an ON position, then the method 300 proceeds to step 306. In step 306, the method 300 stores each bookmark entry received from the remote platform device 104 in a bookmark file 136 comprising the bookmark table 138 on the local platform computer 102. One embodiment of step 306 is described below with reference to FIG. 4.

Specifically, the bookmarks created by the local browser 134 on the local platform computer 102, as well as bookmarks created from the remote platform devices 104 are categorically stored in the bookmark table 138 comprising the URL $202_1$, source $202_2$, source specific data $202_3$, and a timestamp $202_4$, amongst other typical bookmark information $202_{5-n}$ for each bookmark entry, thereby forming the bookmark file 136. Once the bookmark entries from a remote source 104 are stored on the local platform computer 102 in step 306, the method 300 proceeds to step 308. Alternately, if in step 304, if the query is negatively answered, i.e., the bookmark flag is set in an OFF position, then the method ignores step 306 and proceeds directly to step 308.

In step 308, the local browser 134 at the local platform computer system 102 waits for an event. An event is anything corresponding to browser activity such as connecting to a link, selecting a bookmark, and the like. In step 310, the method 300 queries whether a bookmarking event has occurred at the local platform computer 102. If not, the user has not bookmarked a web site, then the method 300 proceeds to step 312, where the local browser 134 addresses other browser events. The method 300 then returns to step 308 to wait for another browser event to occur. In this manner, the browser constantly queries for a bookmark event.

However, if in step 308 a bookmarking event occurs, then the method 300 proceeds to steps 314 through 322 where various fields of the table 138 are populated to generate a bookmark entry. Specifically, in step 314, the URL field $202_1$ in the bookmarking table 138 is set to the URL address. In step 316, the source field $202_2$ is set to the source of the bookmark, e.g., the local platform computer or main terminal in the source field. In step 318, the data field $202_3$ is illustratively set to an Internet protocol (IP) address of the computer, and in step 320, the temporal information is set in the timestamp field $202_4$. The method 300 then proceeds to step 322 where the bookmark entry is stored (i.e., written) via the bookmark file 136 on the RAM or hard drive of the local computer 102. Thereafter, the method 300 proceeds to step 308 where the method 300 queries subsequent browser events and proceeds in the same manner until the user terminates the use of the browser. Upon browser termination, the method 300 ends in step 324.

Figure 4:
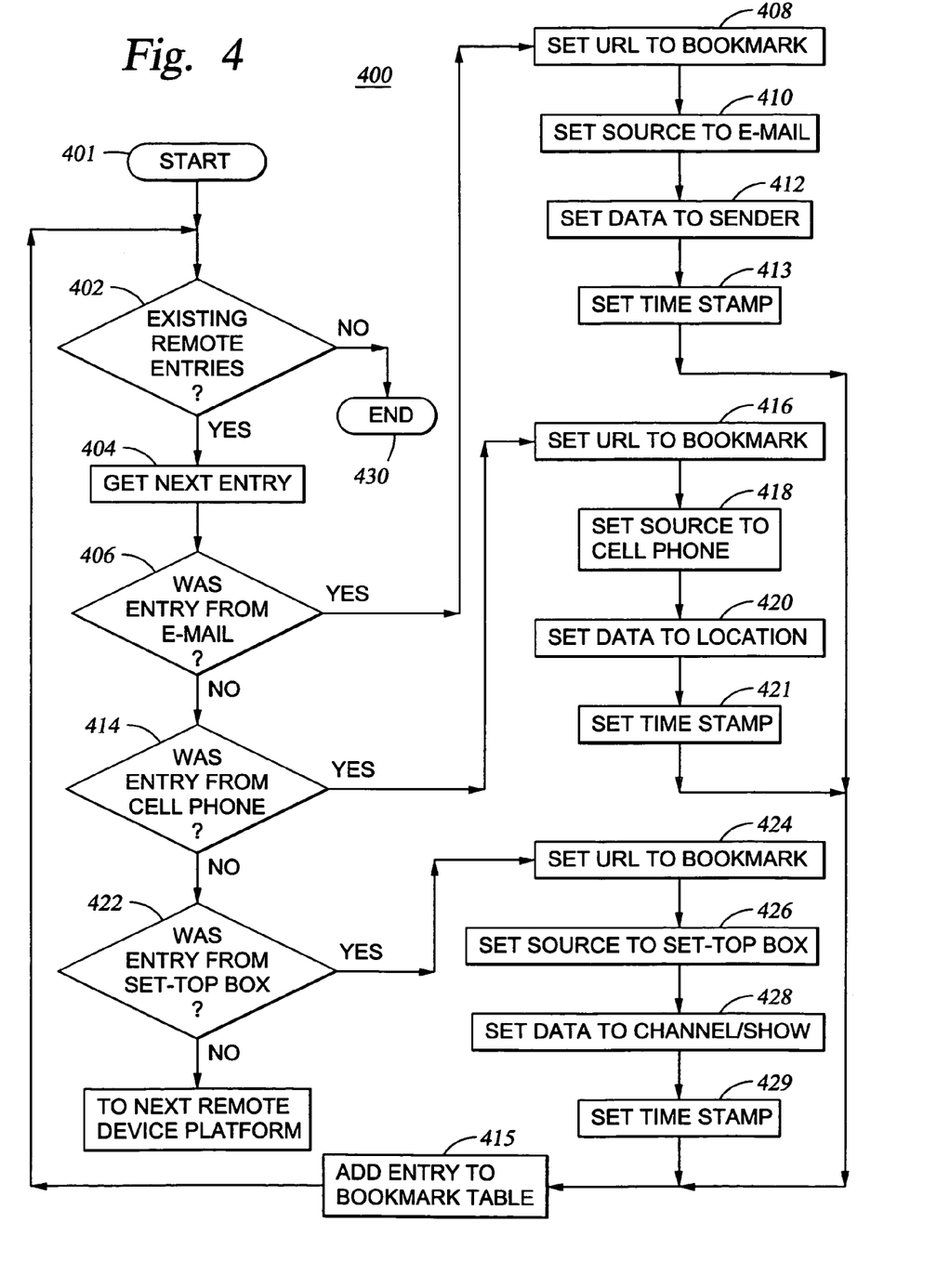
FIG. 4 depicts a flowchart of a method of managing bookmark information from a remote source in accordance with the present invention.

FIG. 4 depicts a flowchart of a method of managing bookmark information from a remote source in accordance with the present invention. Specifically, FIG. 4 depicts one embodiment of step 306 of method 300 in FIG. 3, where bookmarks from remote sources have been created by a user on a remote platform device 104 and are going to be added to the bookmark table 138 (shown in FIG. 2).

The method 400 begins at step 401 only in an instance where a remote bookmark flag has been set to ON in method 300. Once the remote bookmark flag is set ON, method 400 begins at step 401, and proceeds to step 402 where the local browser 134 reads at least one remote device file 145 containing all the remote entries that were sent to the local platform computer 102 of the user. The bookmark entries may be transmitted from the remote platform device 104 to the local platform computer 102 via any known or unknown file transfer technique. In networking contexts, illustrative protocols include File Transport protocol (FTP), File Transfer Access and Management (FTAM), Autonomous FTP, and the like. For file transfers over a modem, Kermit, XMODEM, YMODEM, and ZMODEM are some of the available protocols.

Referring to step 402, the local platform computer 102 reads the remote entries and proceeds to step 404 where the method 400 retrieves information pertaining to a first remote bookmark entry. In step 406 a query is performed to determine if the information pertaining to the first remote bookmark entry was from an e-mail source. If the query in step 406 is affirmatively answered, then the method 400 proceeds to step 408 where the address of the URL is identified from the remote device file information and populated in the first field (column $202_1$, row $204_1$) of the file address table 138 as illustratively depicted in FIG. 2. The method then proceeds to step 410, where the source information is identified and populated in the source field $202_2$ of the bookmark table 138. In this instance, the source field $202_2$ is set to "e-mail". In step 412, the specific source data information is identified and the specific source data field $202_3$ is set to illustratively, the name of the sender. In step 413, timestamp information is identified and populated in a timestamp field $202_4$. The method then proceeds to step 415 where the entire bookmark entry, including information in other bookmark fields $202_{5-n}$ for such entry, is stored in the bookmark table 138 of the bookmark file 136 on the local platform computer 102. In this manner, bookmark information of the remote platform device 104 is first populated in each field of the bookmark table 136 to form a bookmark entry, and then the entire bookmark entry is stored in the bookmark table 138. The method 400 then returns to step 402 where the method 400 reads through the remaining bookmark entries, if present. If no other entries have been sent to the local platform computer 102, then the method 400 ends in step 430.

If however, in step 402, the local platform computer 102 has received additional bookmark entries in the remote device file 145, then the method 400 again proceeds to step 404 to retrieve the next bookmark entry for storage in the bookmark table on the local platform computer system 102. If the next remote device file 145 bookmark entry comprises e-mail information, then the method 400 proceeds from steps 408 through 415 as discussed above. If however, in step 406, the remote device file information is not e-mail related, then the method proceeds to step 414 to query if the information is from a cellular phone. If the query is negatively answered, the method 400 proceeds to step 422. If, in step 414 the query is affirmatively answered, then method 400 proceeds to steps 416 through 421. In step 416, the URL address information is populated in URL field $202_1$. In step 418, the source field $202_2$ is set to "cellular phone". In step 420, the source specific data field $202_3$ is illustratively populated with information regarding a location of the caller (if available) and/or a phone number. In step 421, timestamp information of when the bookmark was created is set in the timestamp field $202_4$ of the bookmark table 136. In this manner, the remote platform device's 104 bookmark information is respectively populated in the fields to form a bookmark entry in the bookmark table 136. The method 400 then proceeds to step 415 where the bookmark entry is stored in the bookmark table 138 of the bookmark file 136 in the local platform computer 102. The method 400 then returns to step 402 where the method 400 repeats as discussed previously.

If the source is not an e-mail or a cellular phone source, then in step 422, the method queries whether the bookmark source is from a set-top box. If in step 422, the bookmark source is from a set-top box, then in step 424, the address information of the bookmark is set in the URL field $202_1$ of the bookmark table 138. The method proceeds to step 426 where the source is set to "set-top box" in the source field $202_2$, and in step 428, a channel, program, and/or other pertinent information is set in the source specific data field $202_3$. In step 429, timestamp information is populated in the timestamp field $202_4$ of the bookmark table 138 to identify when the bookmark was generated. Thereafter, in step 415, the bookmark entry is added to the bookmark table 138 of the bookmark file 136. The method 400 then proceeds back to step 402 to search the at least one remote device file 145 for another bookmark entry.

However, if in step 422, the entry is not from a set-top box, then the method 400 proceeds to the next type of remote platform device 104 capable of creating a bookmark from a browser. A person skilled in the art will recognize that the bookmark entry search order is not fixed and that bookmarks from other types of remote platform devices 104 (e.g., laptop, PDA, and the like) are included in the scope of the invention. Once all the bookmark information from the at least one remote device file 145 have been identified, added to the fields of the bookmark table 138 to form a bookmark entry, and stored in the bookmark file 136, the method 400 ends in step 430. Thereafter, method 308 of method 300 continues as discussed above.

The embodiments disclosed herein allow a user of an Internet browser to recall pertinent information about a bookmark for future reference and management. For example, in the case of e-mail, such information may include the party who sent the bookmark, the origination, and the like. In the case of a set-top box, information such as the channel or program, which was being viewed when the bookmark was generated, is available to a user. Furthermore, the source identifier and source specific data field provides a user with additional categories to perform managerial functions such as querying, filtering, and sorting. Thus, an inventive method of cataloging and providing bookmark history for local and remote platform devices having Internet browsers is presented.

Although several preferred embodiments that incorporate the teachings of the present invention have been shown and described in detail, those skilled in the art can readily devise many other varied embodiments that still incorporate these teachings.

What is claimed is:

1. A method for managing bookmark information in a data structure residing on a computer, comprising:

collecting network addresses and source identifier information during an Internet browsing session;

storing the network addresses as bookmarks containing source identifier information,
wherein the network address refers to a network address of a bookmarked document, and wherein the source identifier information identifies a specific source, of a plurality of sources, at which a bookmark to the document was created and stored;
sending stored bookmarks and corresponding source identifier information to the computer as bookmark information entries;
receiving a plurality of bookmark information entries; and
storing the bookmark information entries in the data structure.

2. The method of claim 1, wherein the plurality of sources is selected from the group comprising of a laptop, a cellular phone, e-mail, a personal data assistant, a set-top box, a watch, a hand-held computer, a pager, and a desktop computer.

3. The method of claim 1, wherein the data structure is a bookmark table having at least one bookmark entry.

4. The method of claim 1, further comprising populating a plurality of fields with the bookmark information to form the at least one bookmark entry.

5. The method of claim 1, further comprising collecting the bookmark information as at least one bookmark entry in a bookmark table.

6. The method of claim 1, wherein the plurality of bookmark entries is received from a remote network source different from any of the plurality of sources.

7. The method of claim 6, wherein the plurality of sources is selected from the group comprising of a laptop, a cellular phone, e-mail, a personal data assistant, a set-top box, a watch, a hand-held computer, a pager, and a desktop computer.

8. The method of claim 1, wherein the network is the Internet and the network addresses are Uniform Resource Locators (URLs).

9. The method of claim 1, wherein the source identifier information is selected from the group comprising of the laptop, the cellular phone, email, the personal data assistant, the set-top box, the watch, the hand-held computer, a pager, and a desktop computer.

10. The method of claim 1, wherein the source identifier information is selected from the group comprising of person, location, sender, channel, program, and phone number.

11. The method of claim 1, wherein the bookmark information received from the plurality of sources may be administered at a local computer based on the source identifier information.

12. A computer-readable medium having instructions or programs which, when executed by a process cause the process to perform a method, comprising:
collecting network addresses and source identifier information during an Internet browsing session;
storing the network addresses as bookmarks containing source identifier information,
wherein the network address refers to a network address of a bookmarked document, and wherein the source identifier information identifies a specific source, of a plurality of sources, at which a bookmark to the document was created stored;
sending stored bookmarks and corresponding source identifier information to the computer as bookmark information entries;
receiving a plurality of bookmark information entries; and
storing the bookmark information entries in the data structure.

13. The computer-readable medium of claim 12, wherein the plurality of sources is selected from the group comprising of a laptop, a cellular phone, e-mail, a personal data assistant, a set-top box, a watch, a hand-held computer, a pager, and a desktop computer.

14. The computer-readable medium of claim 12, wherein the data structure is a bookmark table having at least one bookmark entry.

15. The computer-readable medium of claim 12, further comprising populating a plurality of fields with the bookmark information to form the at least one bookmark entry.

16. The computer-readable medium of claim 12, further comprising collecting the bookmark information as at least one bookmark entry in a bookmark table.

17. The computer-readable medium of claim 12, wherein the plurality of bookmark entries is received from a remote network source different from any of the plurality of sources.

18. The computer-readable medium of claim 17, wherein the plurality of sources is selected from the group comprising of a laptop, a cellular phone, e-mail, a personal data assistant, a set-top box, a watch, a hand-held computer, a pager, and a desktop computer.

19. The computer-readable medium of claim 12, wherein the network is the Internet and the network addresses are Uniform Resource Locators (URLs).

20. The computer-readable medium of claim 12 wherein each sources of the plurality of sources is a different device and wherein the source identifier information further identifies a context in which a corresponding network address was bookmarked on the respective specific source.

21. The computer-readable medium of claim 12, wherein the source identifier information is selected from the group comprising of person, location, sender, channel, program, and phone number.

22. The computer-readable medium of claim 12, wherein the bookmark information received from the plurality of sources may be administered at a local computer based on the source identifier information.

23. A system, comprising: a computer;
a plurality of bookmarking devices each having a unique source identifier associated therewith and containing a browser adapted to process network addresses and store selected ones of the network addresses collected during an Internet browsing sessions as bookmarks containing the unique source identifier information, wherein each network address refers to a network address of a bookmarked document and wherein the unique source identifier information identifies a specific bookmarking device at which a bookmark to the document was created and stored; and
a network connection connecting the computer to the plurality of bookmarking devices, wherein the plurality of bookmarking devices transfers the respective selected ones of the bookmarked network addresses and the respective unique source identifier to the computer via the network connection in a manner preserving an association between the selected ones of the respective bookmarked network addresses and the respective unique source identifier, whereby a user managing the bookmarked network addresses on the computer can identify their respective sources.

24. The apparatus of claim 23, wherein the network connection comprises the Internet.

25. The apparatus of claim 23, wherein the network connection comprises a wireless connection.

26. The apparatus of claim 23 wherein the unique source identifiers are selected from the group comprising of a laptop, a cellular phone, e-mail, a personal data assistant, a set-top box, a watch, a hand-held computer, a pager, and a desktop computer.

27. The apparatus of claim 23, wherein the computer comprises a data structure for storing the network addresses and unique source identifiers.

28. The apparatus of claim 27, wherein the data structure is a bookmark table having at least one bookmark entry.

29. The apparatus of claim 28, wherein the computer further comprises a second browser for managing the data structure.

30. A method for configuring a device with a source-identifying bookmarking function, comprising:

provuding a networked device with an Internet browser program and a bookmark file installed thereon, the Internet browser program having a bookmarking function to bookmark network addresses by storing the network addresses in the bookmark file; and configuring the networked device to store in the bookmark file, with each bookmarked network address, corresponding source identifier information, wherein the network address refers to a network address of a bookmarked document and wherein the source identifier information identifies the specific networked device at which a bookmark to the document was created: and sending stored bookmarks and corresponding source identifier information to the computer as bookmark information entries.

31. The method of claim 30, further comprising configuring the networked device to store in the bookmark file, with each bookmarked network address, data created at the time the respective bookmarked network address is bookmarked and descriptive of at least a time at which the respective bookmarked network address was bookmarked.

32. The method of claim 30, further comprising configuring the networked device to store in the bookmark file, with each bookmarked network address, data created at the time the respective bookmarked network address is bookmarked and descriptive of at least an email message from which the respective bookmarked network address was bookmarked.

33. The method of claim 30, wherein the data is further descriptive of a sender of the email message.

\* \* \* \* \*